United States Patent
Truong et al.

[11] Patent Number: 6,123,097
[45] Date of Patent: Sep. 26, 2000

[54] APPARATUS AND METHODS FOR CONTROLLING PROCESS CHAMBER PRESSURE

[75] Inventors: Quoc Truong; Imad Yousif, both of San Jose; Vincente Lim, Newark; Craig Bercaw, Sunnyvale, all of Calif.

[73] Assignee: Applied Materials, Inc., Santa Clara, Calif.

[21] Appl. No.: 08/672,891

[22] Filed: Jun. 28, 1996

[51] Int. Cl.[7] .................................................. F16K 49/00
[52] U.S. Cl. .......................... 137/334; 137/341; 137/243; 118/719
[58] Field of Search .................................. 137/334, 341, 137/243; 118/719

[56] References Cited

U.S. PATENT DOCUMENTS

| | | | |
|---|---|---|---|
| 1,333,623 | 3/1920 | McCracken | 137/243 |
| 4,305,419 | 12/1981 | Moen | 137/243 |
| 4,741,354 | 5/1988 | DeMild, Jr. | 137/341 |
| 4,989,626 | 2/1991 | Takagi et al. | 137/341 |
| 4,989,637 | 2/1991 | Dittrich | 137/341 |
| 5,000,225 | 3/1991 | Murdoch | 137/566 |
| 5,413,139 | 5/1995 | Kusumoto et al. | 137/341 |

FOREIGN PATENT DOCUMENTS

| | | | |
|---|---|---|---|
| 2848116 | 6/1979 | Germany | 137/243 |
| 26736 | of 1912 | United Kingdom | 137/243 |

*Primary Examiner*—A. Michael Chambers
*Attorney, Agent, or Firm*—Townsend & Townsend & Crew

[57] ABSTRACT

The present invention provides an apparatus and methods for controlling gas pressure within a semiconductor process chamber. The apparatus comprises a throttle valve 32 positioned downstream of the process chamber outlet for controlling gas flow therethrough. The throttle valve includes a valve body 41 having a through-hole and a plug 44 movably disposed within the valve body for controlling gas flow through the through-hole. The throttle valve incorporates an abrasive element 86 disposed within the valve body in abrading contact with an exposed surface 89 of the plug. The abrasive element effectively removes gas deposited onto the exposed surface of the valve plug during operation of the throttle valve. In another aspect of the invention, the valve body comprises one or more heating elements 77, 78 thermally coupled to the exposed surface of the valve plug for conductively transferring heat to the exposed surface of the valve plug, thereby inhibiting solidification of process gases that may have deposited on this surface.

17 Claims, 4 Drawing Sheets

APPARATUS AND METHODS FOR CONTROLLING PROCESS CHAMBER PRESSURE

BACKGROUND OF THE INVENTION

The present invention generally relates to the fabrication of integrated circuits. More particularly, the invention provides an improved throttle valve and improved methods for controlling pressure within a processing chamber.

High density integrated circuits, commonly termed VLSI devices, are typically formed on semiconductor wafers by subjecting the wafers to a number of deposition, masking, doping and/or etching processes. The wafers are placed onto a pedestal or susceptor within a process chamber and process gas(es) are delivered into the chamber onto the wafer to perform the various deposition and etching steps. For example, one typical process involves delivering $SiH_4$ and $N_2$ into the process chamber while applying RF energy to form a plasma for depositing silicon nitride on the wafer. During each step, once the appropriate layers have been deposited and/or removed from the wafer, the remaining plasma and gas residue are withdrawn from the process chamber by a suitable vacuum source, such as a pump.

An important consideration in semiconductor processing is the gas pressure within the process chamber. For example, the gas pressure within the process chamber typically affects the characteristics of the layers deposited on the wafer and/or the geometry of the portions etched from the wafer. Small changes in the chamber pressure during processing may lead to non-uniform deposition or etching on the wafer, which is typically undesirable.

The gas pressure within a semiconductor process chamber is usually controlled by a throttle valve disposed along a discharge line between the gas outlet of the process chamber and the pump. The throttle valve is coupled to a pressure sensor, such as a manometer, and an external controller that causes the throttle valve to open and close to regulate the pressure within the chamber. Existing throttle valves usually include a valve body with a through-hole in communication with the discharge line and a plug rotatably disposed within the valve body. The plug is rotated within the valve body by a suitable drive motor to vary the cross-sectional area of the through-hole, thereby regulating the gas flow therethrough and the pressure within the process chamber.

During certain processes, such as high pressure process steps, the throttle valve is substantially closed so that a low gas flow-rate is established through the valve. In this substantially closed position, a surface of the plug blocks a portion of the through-hole and, therefore, is typically exposed to the process gases that are discharged from the chamber along the discharge line. These gas particles bombard the exposed surface of the plug and may adhere and solidify on the plug surface, thereby forming a thin deposition layer on the plug surface.

Gas deposition on the exposed surface of the plug may cause problems with the operation of the throttle valve. For example, the valve plug typically contacts sealing surfaces on the valve body in a substantially frictionless manner as it rotates within the valve body. The sealing surfaces prevent process gases from leaking between the valve body and the plug. However, the gas deposition build-up on the plug surface increases the friction between the plug and the valve body sealing surfaces. This increased friction applies a larger load on the drive motor and may stretch the drive belt that couples the plug shaft with the motor, eventually causing the belt to break. This reduction in the lifetime of the belt increases the downtime of the apparatus, and therefore decreases the throughput of the manufacturing process.

In addition, the valve plug motor is typically configured to rotate in small steps, with each of these steps corresponding to a distinct chamber pressure. This step configuration is considered desirable because it allows the operator to control the chamber pressure by rotating the valve plug a specific number of steps corresponding to the pressure desired. Increased friction between the plug and the valve body may cause the motor to skip steps, thereby disturbing the one-to-one correspondence between the motor steps and chamber pressure intervals. When this occurs, the motor steps will not correspond to their associated pressure settings, which could cause the operator to set an inaccurate chamber pressure during processing.

Another problem with existing throttle valves is that process gases passing through the valve body may leak between the sealing surfaces of the body and the plug. The gases swirl around within the valve, abrading the sealing surfaces of the valve body and forming grooves within these surfaces. These grooves may eventually become large enough to allow process gas to leak through the throttle valve. Gas leakage through the throttle valve will generally cause a reduction in the process chamber pressure, which can have adverse effects on the desired characteristics of the semiconductor wafer.

What is needed in the semiconductor manufacturing industry, therefore, are improved methods and apparatus for controlling the gas pressure within a process chamber. These methods and apparatus should be designed to inhibit gas deposition and subsequent solidification on the throttle valve, thereby improving operation of the motor and increasing the lifetime of the valve, which increases the throughput of the process. In addition, these methods and apparatus should be capable of minimizing leakage of gas through the valve body to effectively maintain the desired pressure within the process chamber.

SUMMARY OF THE INVENTION

The present invention provides apparatus and methods for controlling gas pressure within a semiconductor process chamber, such as a vapor deposition chamber. The apparatus comprises a throttle valve positioned downstream of the process chamber outlet for controlling gas flow therethrough. The throttle valve includes a valve body having a through-hole, and a plug movably disposed within the valve body for controlling gas flow through the through-hole. When the valve is at least partially closed, a surface of the valve plug is positioned within the through-hole. Consequently, this surface is exposed to the process gases that are discharged from the chamber during processing. According to the present invention a deposition removal device is coupled to the valve body for removing gas deposition and/or inhibiting gas solidification on this exposed surface to minimize disruption of valve operation during processing.

In one embodiment, the deposition removal device is an abrasive element disposed within the valve body in abrading contact with the exposed surface of the plug. The abrasive element effectively removes gas deposited onto the exposed surface of the valve plug during operation of the throttle valve. This minimizes friction between the plug and the valve body during operation of the throttle valve. For example, in an exemplary embodiment, the valve plug is rotated within the valve body by a drive motor. Maintaining a relatively smooth, low-friction engagement between the valve body and the plug reduces the load on the motor and minimizes wear on the drive belt coupling the motor to the plug. This leads to a longer drive belt lifetime which, in turn, reduces the downtime of the apparatus, thereby increasing the throughput of the manufacturing process. In addition, a smoother engagement between the valve body and the plug will help prevent the motor from skipping steps, thereby ensuring more accurate control of the processing chamber pressure.

In a specific configuration, the valve body comprises first and second sealing members having smooth inner surfaces conforming to the valve plug, to allow the valve plug to move between the sealing members while preventing gas leakage between the plug and the valve body. The abrasive element is embedded into a recess within one of the sealing member surfaces such that the abrasive element frictionally engages the exposed surface of the plug as the plug rotates within the valve body. Preferably, the abrasive element will comprise a relatively hard material that is substantially aligned with one of the sealing surfaces to remove gaseous deposition build-up on the exposed surface while minimizing damage to the actual valve plug. In a preferred embodiment, the abrasive element comprises a metallic blade embedded into one of the sealing surfaces so that the blade is flush with the sealing surface.

The valve plug comprises a passage extending therethrough which is substantially aligned with the through-hole of the valve body to allow gas to pass through the throttle valve when the valve is in an open position. In a preferred configuration, the sealing members substantially circumscribe the valve plug so that the valve plug passage is sealed from the interior of the valve body as the plug rotates within the valve body. This configuration minimizes leakage of gas from the through-hole, alleviating the problem of fine gas particles swirling around within the valve body, thereby increasing the lifetime of the sealing surfaces.

In another aspect of the invention, the deposition removal device includes one or more heating elements thermally coupled to the exposed surface of the valve plug. The heating elements transfer heat to the exposed surface of the valve plug to inhibit solidification of process gases that may have deposited on this surface. In a specific configuration, the heating elements comprise heating cartridges coupled to the valve body adjacent to or near the plug's exposed surface for conductively transferring heat to the exposed surface, thereby removing process gas from this surface.

DESCRIPTION OF THE PREFERRED EMBODIMENTS

I. Exemplary Vapor Deposition Apparatus

Figure 1:
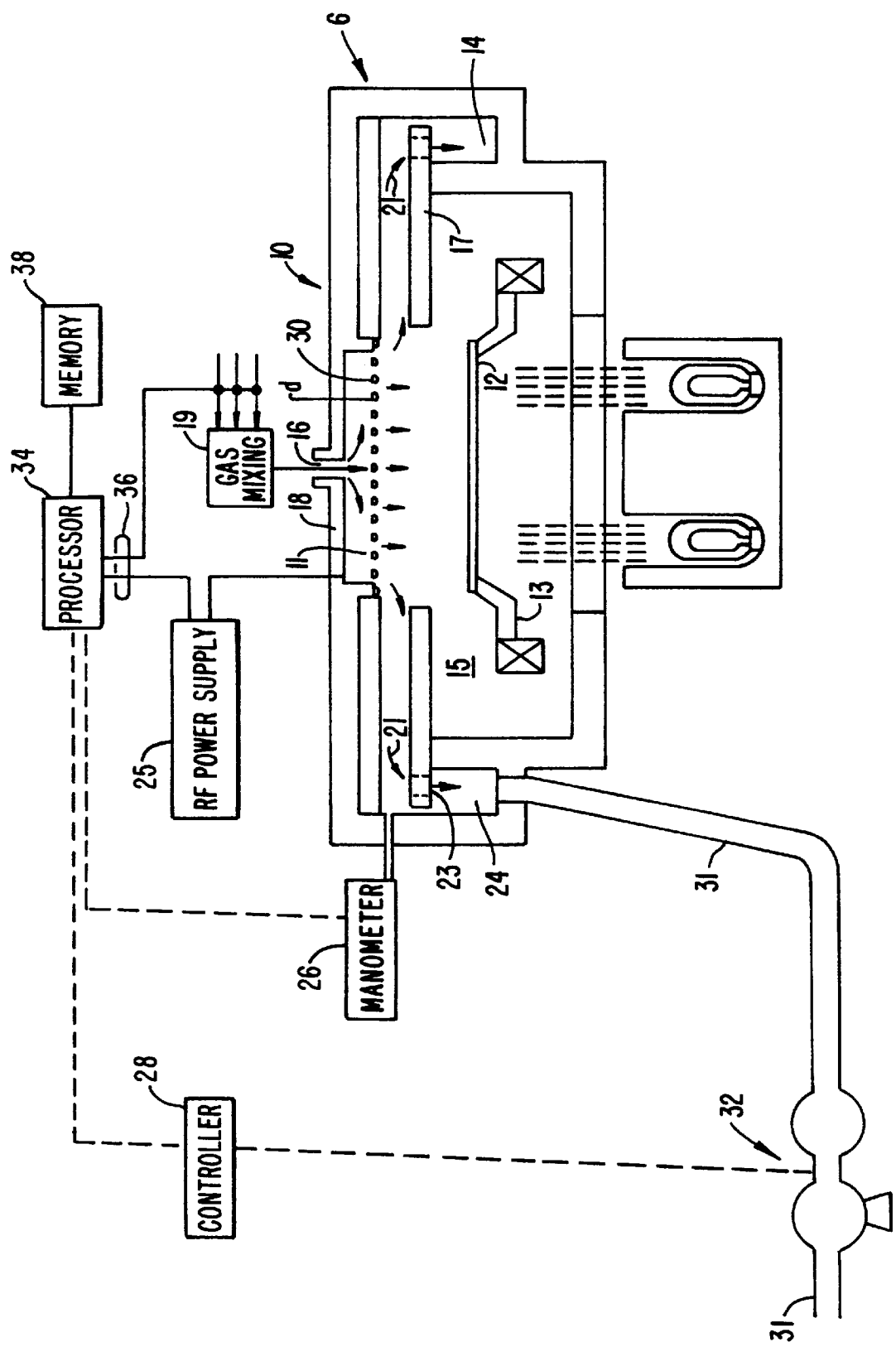
FIG. 1 schematically depicts a representative CVD plasma apparatus incorporating a throttle valve according to the present invention.

Referring to FIG. 1, a representative vapor deposition apparatus 10 capable of CVD processing incorporates a throttle valve 32 fabricated in accordance with the principles of the present invention. Vapor deposition apparatus 10 generally includes an enclosure assembly 6 having a vertically movable wafer support pedestal or susceptor 12 beneath a showerhead 30 through which process gases enter a vacuum chamber 15. A pumping plate 17 extends around susceptor 12 for discharging the process gases and other plasma residue from chamber 15 into a pumping channel 14 partially circumscribing chamber 15.

Vapor deposition apparatus 10 is preferably attached to a mainframe unit (not shown) which provides electrical, plumbing and other support functions for the apparatus 10. Mainframe units that are compatible with the illustrative embodiment of vapor deposition apparatus 10 are currently commercially available as the Precision 5000™ and the Centura 5200™ systems from Applied Materials, Inc. of Santa Clara. It should be understood, however, that although the invention is shown and described as part of a vapor deposition chamber in a multi chamber processing system, it is not intended to be limited in this manner. That is, the invention can be used in a variety of processing chambers, such as etch chambers, diffusion chambers or the like.

Enclosure assembly 6 is preferably an integral housing made from a process compatible material, such as aluminum or anodized aluminum. Assembly 6 includes an upper lid 18 and an inlet tube 16 for allowing deposition gases to enter showerhead 30, where they are uniformly dispersed throughout chamber 15 onto a wafer (not shown) supported on susceptor 12. The deposition process performed in apparatus 10 can be a thermal process, a plasma enhanced process or other suitable process.

In a plasma process, a controlled plasma is formed adjacent to the wafer by RF energy applied to showerhead 30 from an RF power supply 25. RF power supply 25 can supply either single or mixed frequency RF power to showerhead 30 to enhance the decomposition of reactive species introduced into process chamber 15. Purging gas may be delivered into chamber 15 from an inlet port or tube (not shown) through the bottom wall of enclosure assembly 6. RF power supply 25 is controlled by a processor 34, which operates under the control of a computer program stored in a memory 38. The computer program dictates the timing, mixture of gases, chamber pressure, chamber temperature, RF power levels, susceptor position, and other parameters of a particular process.

A pump (not shown) disposed exterior to apparatus 10 provides vacuum pressure within pumping channel 14 to draw both the process and purge gases out of chamber 15 and through the pumping channel 14, where they are discharged from apparatus 10 along a discharge conduit 31. The flow rate of the gases through pumping channel 14 is preferably controlled by throttle valve 32 which is suitably disposed along conduit 31. The pressure within processing chamber 15 is monitored with a manometer 26 and controlled by varying the flow cross-sectional area of conduit 31 with throttle valve 32 (discussed in further detail below). Preferably, processor 34 receives from manometer 16 signals that indicate the chamber pressure. Processor 34 will compare the measured pressure value with set point pressure values entered by operators (not shown), and determine the necessary adjustment of throttle valve 32 that is required to maintain the desired pressure within chamber 15. The processor 34 relays an adjustment signal through a controller 28 to a drive motor (not shown), which adjusts throttle valve 32 to a proper setting corresponding to the set point pressure value.

Typically, any or all of the chamber lining, showerhead, support fingers, and various other reactor hardware is made out of material such as aluminum or anodized aluminum. An example of such a CVD apparatus is described in U.S. Pat. No. 5,000,113 entitled "Thermal CVD/PECVD Reactor and Use for Thermal Chemical Vapor Deposition of Silicon Dioxide and In-situ Multi-step Planarized Process," issued to Chang et al. and assigned to Applied Materials, Inc., the assignee of the present invention, and is incorporated herein by reference for all purposes.

The above apparatus description is mainly for illustrative purposes and should not be considered as limiting the scope of the present invention. Variations of the above described apparatus such as variations in susceptor design, heater design, location of RF power connections and others are possible.

II. Exemplary Throttle Valve

Figure 2:
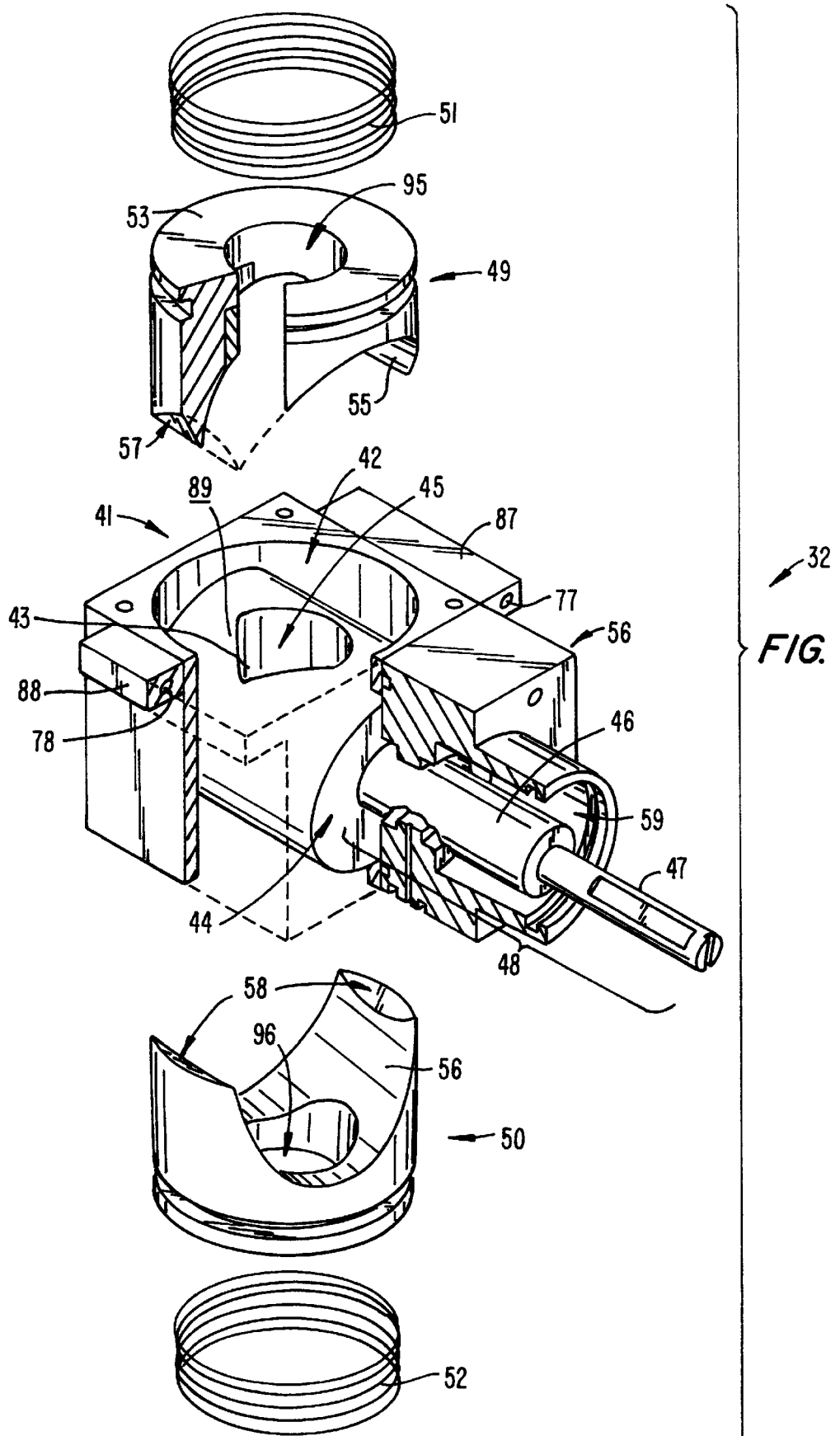
FIG. 2 is an exploded view of the throttle valve of FIG. 1, illustrating an abrasive element for inhibiting gas deposition buildup on an exposed surface of a valve plug.
Figure 3:
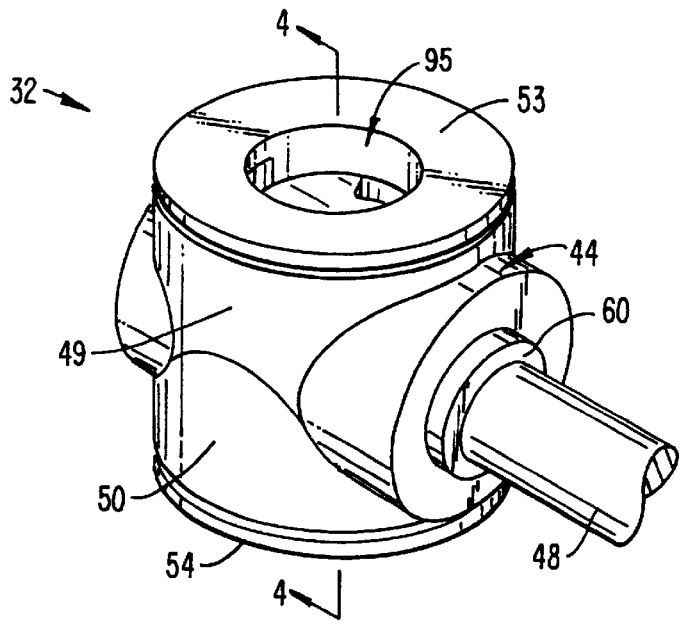
FIG. 3 is a perspective view of the valve plug of FIG. 2 movably disposed within first and second sealing members.
Figure 4:
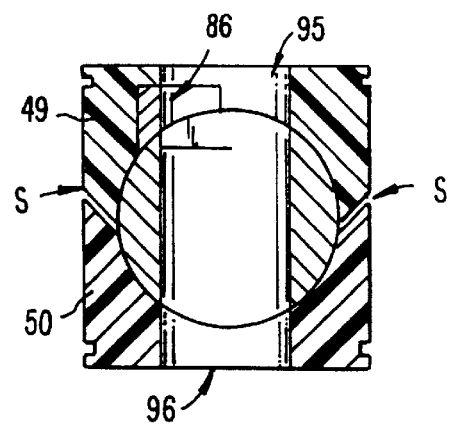
FIG. 4 is a side cross-sectional view of the sealing members and valve plug taken along lines 4—4 in FIG. 3.
Figure 5:
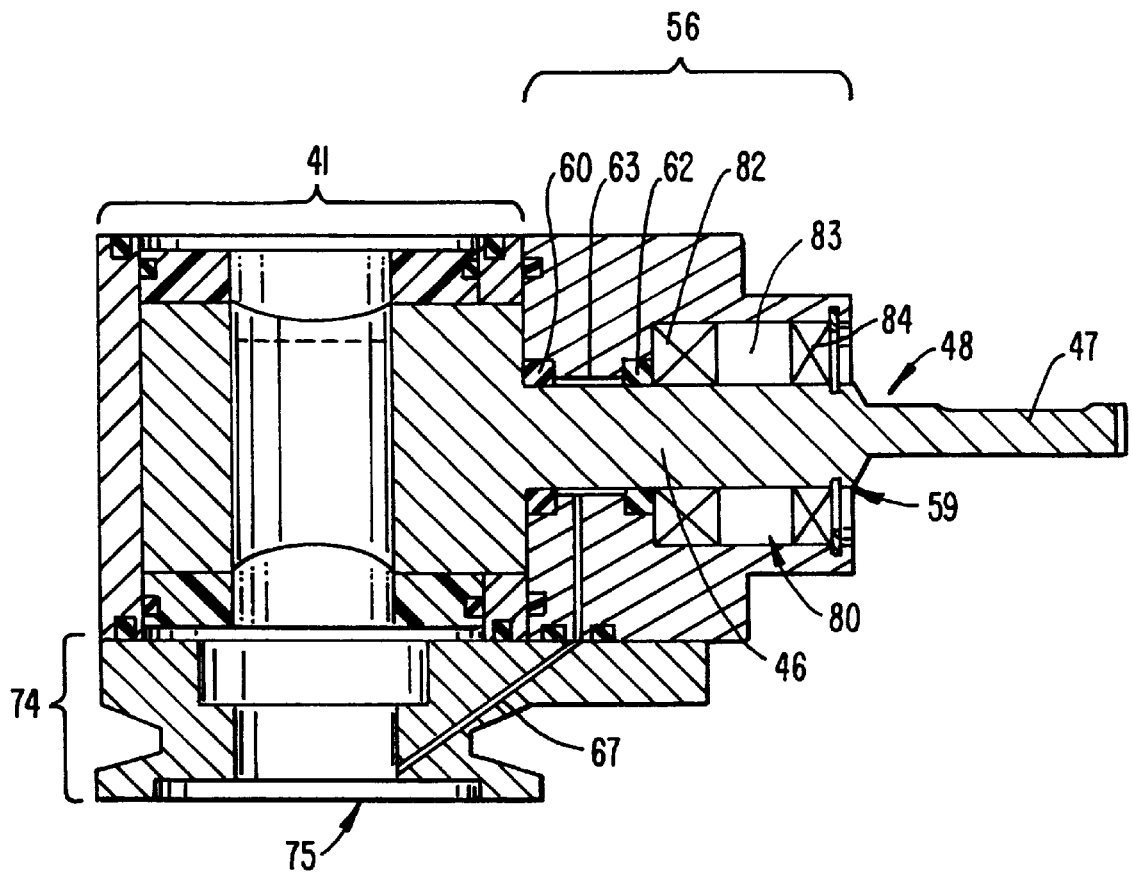
FIG. 5 is a side cross-sectional view of the throttle valve of FIG. 1.

Referring to FIGS. 2–6, throttle valve 32 of the present invention will now be described in detail. As shown in FIG. 2, throttle valve 32 generally includes a valve body 41, and a valve plug 44 rotatably mounted between a pair of sealing members 49, 50 within body 41 for controlling gas flow through a through-hole 42. As shown in FIG. 5, first and second flanges 74 are mounted to valve body 41 on either end of through-hole 42 for attaching throttle valve 32 to discharge conduit 31 (note that only one flange 74 is shown in FIG. 5). Flanges 74 each have a hole 75 that couples through-hole 42 with discharge conduit 31 upstream and downstream of throttle valve 32. Sealing members 49, 50 each have central openings 95, 96, respectively, fluidly coupled to an inner passage 45 within valve plug 44. Openings 95, 96 and passage 45 connect either end of through-hole 42 of valve body 41 for allowing gas flow therethrough. As discussed below, rotation of valve plug 44 and passage 45 relative to openings 95, 96 varies the effective cross-sectional area of openings 95, 96 to thereby control the flow of gas through valve body 41.

Figures 7A, 7B, 7C:
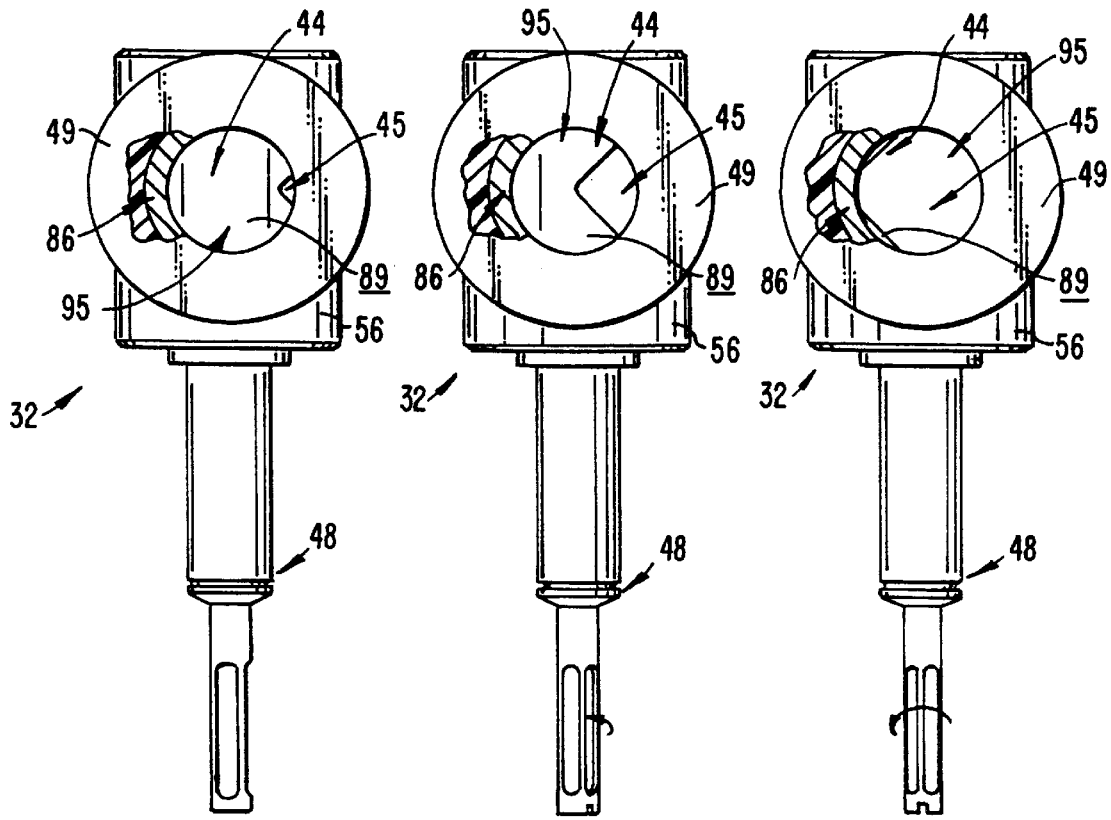
FIGS. 7A–7C are partial cut-a-way views of the throttle valve of FIG. 2, illustrating the method of the present invention for removing gas deposited on the exposed surface of the valve plug.

As shown in FIGS. 7A–7C, valve plug 44 is movable between an open position (FIG. 7C), where passage 45 and openings 95, 96 of sealing members 49, 50 (only one opening 95 shown in FIGS. 7A–7C) are substantially aligned to allow a generally large rate of gas flow therethrough, and a substantially closed position (FIG. 7A), where passage 45 has been rotated out of alignment with openings 95, 96 to allow a relatively low rate of gas flow therethrough. Valve plug 44 defines a surface 89 adjacent to passage 45 that is aligned with opening 95 and the upstream portion of discharge conduit 31 (see FIG. 1) in the closed or partially closed configurations of throttle valve 32 (FIGS. 7A and 7B). As discussed in more detail below, exposed surface 89 is typically subjected to gaseous deposition during processing when the throttle valve is at least partially closed.

Referring again to FIG. 2, valve plug passage 45 is generally cylindrical and includes a side portion 43 adjacent exposed surface 89 that tapers in the radial direction. Tapered side portion 43 provides more precise control of the chamber gas pressure (as compared to the cylindrical portion of passage 45), especially in high-pressure processes, because each degree of rotation of valve plug 44 corresponds to a relatively small change in the cross-sectional area of opening 95 that is aligned with passage 45. Thus, each degree of rotation of valve plug 44 will correspond to a relatively small change in the flow rate therethrough. If lower chamber pressure is desired, plug 44 can be rotated further so that a larger opening is available, allowing for a higher rate of gas flow through valve 32. It should be noted, however, that while the relatively narrow, tapered side portion 43 of plug passage 45 allows for finer control of the chamber pressure, if this portion 43 is designed too narrow, it could become an ideal site for deposition and solidification of process gases, which would eventually clog portion 43 of passage 45.

As shown in FIGS. 2 and 3, sealing members 49 and 50 have generally planar outer surfaces 53 and 54, respectively, facing discharge conduit 31 (FIG. 1) on either side of valve body 41. In addition, first and second sealing members 49 and 50 have arcuate inner sealing surfaces 55 and 56, respectively, shaped to conform to valve plug 44 within valve body 41. Arcuate inner sealing surfaces 55 and 56 provide a gas seal between valve plug 44 and sealing members 49 and 50 while allowing plug 44 to rotate between sealing members 49 and 50.

Sealing members 49 and 50 usually comprise a relatively soft material that readily deforms when compressed against the hard valve plug 44 to provide an effective seal therebetween. In addition, sealing members 49 and 50 will preferably comprise a smooth material that provides a relatively frictionless interface with valve plug 44 to minimize interference with the movement of plug 44. Preferably, sealing members 49 and 50 are made of Teflon, but they also may comprise other suitable materials, such as rubber, PTFE and the like. As shown in FIG. 3, sealing members 49 and 50 preferably extend around the entire circumference of valve plug 44 so that valve plug passage 45 is completely sealed as plug 44 rotates within valve body 41. Thus, sealing members 49 and 50 effectively eliminate (or at least minimize) the leakage of process gases between sealing members 49 and 50, and valve plug 44. This prevents fine gas particles from swirling around within throttle valve 32 to increase the lifetime of inner sealing surfaces 55 and 56.

Figure 6:
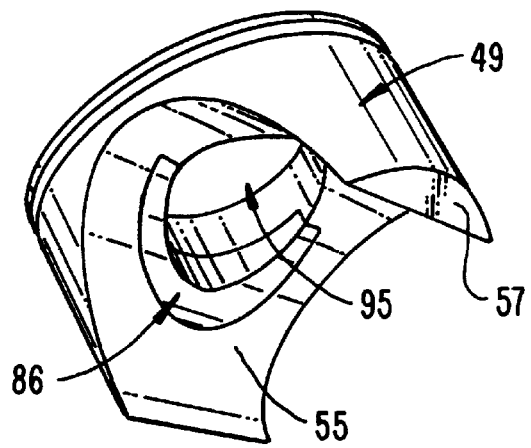
FIG. 6 is a perspective view of an abrasive element embedded into one of the sealing members of FIG. 3.

As shown in FIGS. 2 and 6, first and second sealing members 49 and 50 each have complementary tapered ends 57 and 58 that mate with each other to define a slit 5 therebetween (See FIG. 4). To increase the sealing pressure against valve plug 44, throttle valve 32 includes first and second springs 51 and 52 biased against planar outer surfaces 53, 54 of sealing members 49 and 50. Springs 51 and 52 compress sealing members 49 and 50 against valve plug 44 to enhance the seal therebetween. Slit 5 provides a space between members 49, 50 to allow springs 51 and 52 to further compress sealing members 49 and 50 against valve plug 44, thereby improving the gas seal. In a preferred embodiment, washers (not shown) are inserted between springs 51 and 52 and planar outer surfaces 53, 54 to prevent the springs from biting into the soft sealing members 49 and 50. The washers also help to distribute the weight of springs 51 and 52 more uniformly against sealing members 49 and 50.

Referring to FIGS. 2 and 5, valve body 44 is mounted to a housing 56 for coupling valve body 44 to the drive motor (not shown). The drive motor preferably comprises a reversible DC or AC motor, such as a stepper motor, that is suitably coupled to a drive shaft 48 for rotating valve plug 44. Preferably, the drive motor will be coupled to drive shaft 48 via a series of gears. However, drive belts or other suitable coupling mechanisms may be utilized for this purpose. Housing 56 defines an inner hole 59 for rotatably supporting drive shaft 48. Drive shaft 48 has a first end portion 46 coupled to valve plug 44 and a second end portion 47 connected to the drive motor for rotating shaft 48 and valve plug 44 relative to housing 56 and valve body 41. In a preferred configuration, a pair of bearings 82, 84 mounted within a cavity 80 in housing 56 serve to rotatably support shaft 48. Bearings 82 and 84 are separated by a spacer 83 for providing support to shaft 48 and minimizing shaft bending. Spacer 83 also helps distribute the weight along shaft 48 to generate a substantially uniform load on the drive shaft 48.

As shown in FIGS. 2 and 5, inner hole 59 of housing 56 is sealed from through-hole 42 of valve body 41 by a pair of annular lip seals 60 and 62 disposed around first end portion 46 of shaft 48. Lip seals 60 and 62 preferably include embedded springs (not shown) to bias the seals against the inner walls of housing 56. Lip seals 60 and 62 define an annular cavity 63 therebetween. Cavity 63 is fluidly coupled to discharge conduit 31 downstream of throttle valve 32 by a fluid passage 67 extending through housing 56 and flange 74. In this way, any gas that leaks through first lip seal 60 into cavity 63 will be drawn through passage 67 into discharge conduit 31 by the pump (not shown), allowing throttle valve 32 to operate effectively under subatmospheric conditions.

Referring again to FIG. 2, throttle valve 32 preferably includes one or more heating elements mounted to valve body 41 for conductively transferring heat to exposed surface 89. Increasing the temperature of surface 89 helps to prevent solidification of gas particles that have deposited onto and adhered to surface 89. This inhibits gas from building up on exposed surface 89, which minimizes movement obstruction of valve plug 44 within valve body 41. In a preferred configuration, the heating elements are heat cartridges 77, 78 positioned within mounts 87 and 88, which are attached to either side of valve body 41 near the upstream end of throttle valve 32. In this way, heat cartridges 77, 78 can conductively transfer heat through valve body 41 to exposed surface 89 of valve plug 44.

III. Exemplary Abrasive Element

According to the principles of the present invention, an abrasive element 86 is embedded within a cavity of first sealing member 49, as shown in FIG. 6. Abrasive element 86 functions to remove gas deposited on exposed surface 89 of valve plug 44 during processing, thereby minimizing friction between valve plug 44 and sealing members 49, 50. To that end, abrasive element 86 preferably comprises a relatively hard material, such as stainless steel, tungsten and the like. As valve plug 44 rotates within valve body 41, abrasive element 86 frictionally engages exposed surface 89 to remove any gas deposited on this surface. The gaseous deposition will usually then be drawn through passage 45 by the pump.

In a preferred configuration, abrasive element 86 is a stainless steel blade substantially aligned with inner surface 55 of sealing member 49. Abrasive element 86 will usually remove gas deposited onto surface 89 without abrading the actual surface 89 of valve plug 44. As shown in FIG. 6, abrasive element 86 preferably extends about halfway around passage 45 to ensure that element 86 is in abrading contact with the entire exposed surface 89 of valve plug 44. Although the exact dimensions of abrasive element 86 will vary depending on the size and shape of the components of throttle valve 32, abrasive element 86 will usually have a radius of curvature of about 0.5 to 0.7 inches and a height of about 0.2 to 0.3 inches.

It should be understood that the present invention is not limited to the abrasive element 86 described above and illustrated in the drawings. For example, the invention may include a plurality of separate abrasive elements (not shown) for frictionally engaging exposed surface 89 rather than a single, continuous element. Alternatively, throttle valve 32 may incorporate an abrasive element that is separate from sealing members, and coupled to an actuator for moving the abrasive element in abrading contact with exposed surface 89. In this embodiment, the abrasive element can be controlled by a processor to periodically move into contact with surface 89 and remove gas deposited thereon.

IV. Exemplary Methods for Inhibiting Oxide Deposition on the Exposed Plug Surface A method for inhibiting gaseous deposition buildup on exposed surface 89 of valve plug 44 will now be described in reference to FIGS. 7A–7C. During processing, particularly during processing that requires a relatively high gas pressure within chamber 15, throttle valve 32 will usually be in a partially closed position (FIG. 7A) to allow a low gas flow therethrough. When throttle valve 32 is in this position, exposed surface 89 of valve plug 44 is substantially aligned with opening 95 of sealing member 49 and, therefore, will be bombarded by process gases passing through discharge conduit 31 into throttle valve 32. As the process gases are deposited onto exposed surface 89, the gases will begin to adhere to surface 89 and solidify. The solidified gas particles form a thin layer of oxide deposition on surface 89 which may tend to obstruct rotation of valve plug 44.

As shown in FIG. 7B, valve plug 44 is rotated in a counterclockwise direction relative to valve body 41 so that passage 45 becomes more aligned with opening 95 and exposed surface 89 moves relative to sealing member 49 and abrasive element 86. As valve plug 44 is rotated, abrasive element 86 frictionally engages exposed surface 89 of plug 44, removing any deposited gas particles from this surface. As valve plug 44 continues to rotate toward the completely open position of FIG. 7C, abrasive element 86 will propel the gas particles toward passage 45 and the pump will draw the gas particles through passage 45, thereby discharging them along conduit 31.

In another aspect of the invention, which may be practiced in addition to, or as an alternative to, the use of abrasive element 86, heating cartridges 77, 78 transfer heat to exposed surface 89 to prevent deposition or solidification of deposited gas particles on this surface. In this method, heating cartridges 77, 78 are heated with a suitable energy source, such as electrical energy, RF energy sources, microwave energy, heat energy and the like. This heat is conductively transferred through valve body 41 to exposed surface 89 of valve plug to maintain the temperature of the plug above a threshold temperature to thereby avoid deposition or solidification of deposited gas particles on surface 89. Instead, the gases particles are drawn through passage 45 by the pump and suitably discharged along conduit 31.

While the above is a full description of the specific embodiments, various modifications, alternative constructions and equivalents may be used. For example, while the description above is in terms of a chemical vapor deposition chamber for a multi chamber processing system, it would be possible to implement the present invention with other plasma etching chambers, physical deposition chambers or the like. Therefore, the above description and illustrations should not be taken as limiting the scope of the present invention as defined by the appended claims.

It should be further noted that the invention is not limited to a single wafer chamber as described above and shown in the enclosed drawings. For example, the throttle valve of the present invention could be installed into a batch chamber that simultaneously processes a plurality of wafers. In addition, the invention would be suitable for use in a multi wafer chamber that sequentially performs individual processing steps on each of the wafers.

What is claimed is:

1. A throttle valve for use with a semiconductor processing chamber, the throttle valve comprising:
   - a valve body having a through-hole an a first sealing element;
   - a plug movably disposed within said valve-body for controlling gas flow through said through-hole, said plug having a passage therethrough, said plug further having an exposed surface in communication with said through-hole; and
   - an abrasive element at least partially disposed within said first sealing element and mounted in frictional contact against said exposed surface, said frictional contact sufficient for removing a gas deposited on said exposed surface.

2. The throttle valve of claim 1, further comprising one or more heating elements disposed to transfer heat to said exposed surface.

3. The throttle valve of claim 2 wherein said heating elements comprise heating cartridges.

4. The throttle valve of claim 3 wherein said heating cartridges are mounted to an exterior surface of said valve body for transferring heat to said exposed surface of said plug.

5. The throttle valve of claim 1 wherein said plug is movable between an open position, where said passage is aligned with said through-hole to allow passage of gas therethrough, and a substantially closed position, where said exposed surface substantially blocks said through-hole for preventing gas flow therethrough.

6. The throttle valve of claim 5 wherein said abrasive element is positioned to frictionally engage said exposed surface of said plug as said plug moves toward the open position to remove aid gas deposited on said exposed surface.

7. The throttle valve of claim 5 wherein said valve body includes a second sealing element said first and second sealing elements on opposite sides of said plug, said sealing elements each having an inner surface conforming to said plug for sealing said passage of said plug, said first sealing element surface has a recess for receiving said abrasive element.

8. The throttle valve of claim 7 wherein said abrasive element has an outer surface substantially flush with said inner surface of said first sealing element to minimize the removal of material from exposed surface of said valve plug.

9. The throttle valve of claim 7 wherein said inner surfaces of said sealing elements comprises a substantially non-abrasive material that conforms to said valve plug.

10. The throttle valve of claim 7 wherein said sealing elements completely surround said plug to seal said passage as the plug is moved within the valve body between the open and closed positions.

11. The abrasive element of claim 1 wherein said abrasive element comprises a substantially hard material.

12. The throttle valve of claim 1 wherein said abrasive element is a metal blade.

13. A throttle valve for use with a semiconductor processing chamber, the throttle valve comprising:
    - a valve body having a through-hole and at least one sealing member;
    - a plug having a passage therethrough, where said plug is movably disposed within said valve-body for controlling gas flow through said through-hole and having an exposed surface in communication with said through-hole; and
    - a gas deposition inhibiting device comprising an abrasive element mounted at least partially in said at least one sealing member and positioned adjacent to said exposed surface, said abrasive element in frictional contact with said exposed surface.

14. A throttle valve as in claim 13 wherein said valve body includes a plurality of sealing members that define a curved surface fitting against contours of the plug, said plug having a cylindrical shape.

15. The throttle valve of claim 14 wherein said plurality of sealing members includes said first sealing member and a second sealing member on opposite sides of said plug, said sealing members each having an inner surface conforming to said plug for sealing said passage of said plug, said first sealing member surface has a recess for receiving said abrasive element.

16. The throttle valve of claim 15 wherein said abrasive element has an outer surface substantially flush with said inner surface of said first sealing member to minimize the removal of material from exposed surface of said valve plug.

17. A throttle valve as in claim 13 wherein said inhibiting device comprises one or more heating elements disposed to transfer heat to said exposed surface.

* * * * *